Patented Dec. 30, 1952

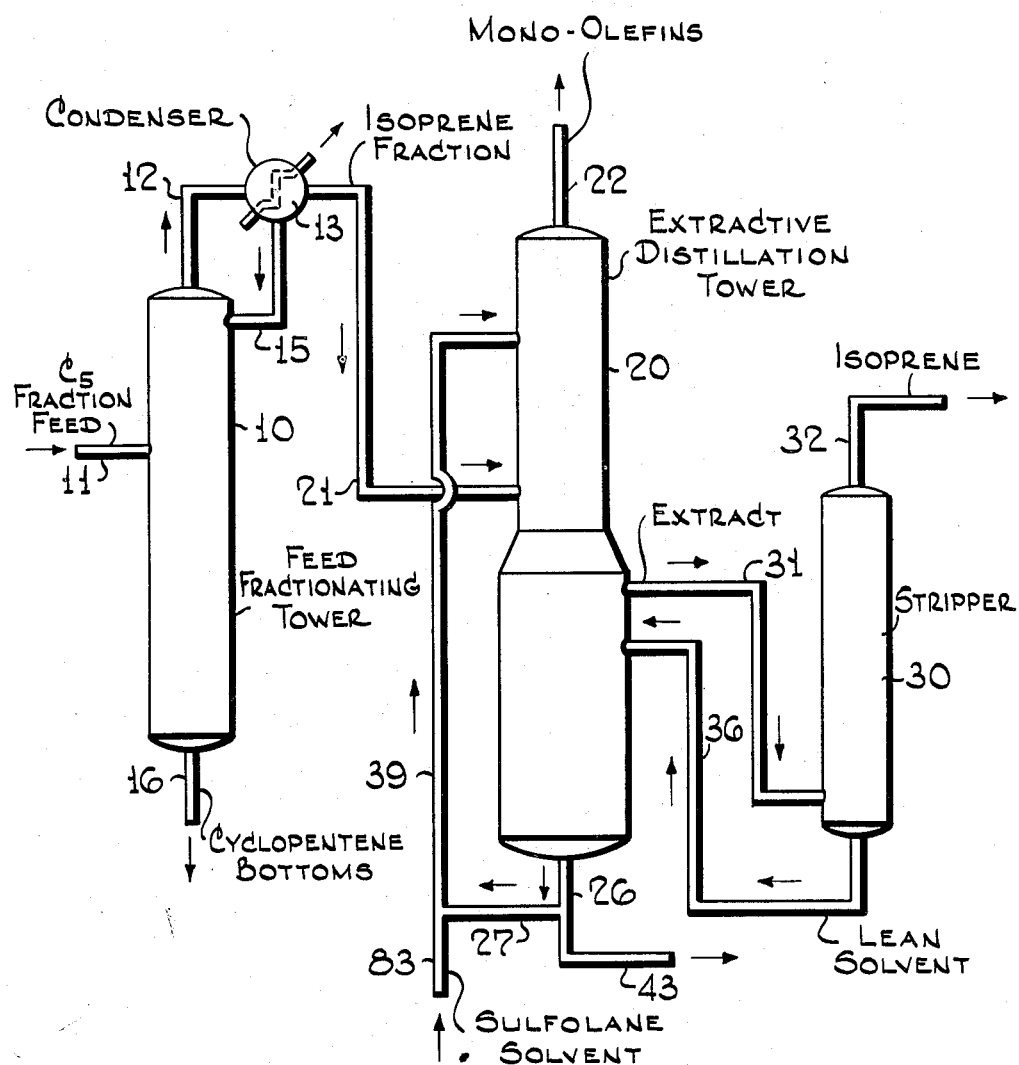

2,623,844

UNITED STATES PATENT OFFICE 2,623,844

EXTRACTIVE DISTILLATION OF ISOPRENE WITH DIMETHYL SULFOLANE

Harold W. Scheeline, West Orange, N. J., assignor to Standard Oil Development Company, a corporation of Delaware Application July 29, 1947, Serial No. 764,557

1 Claim. (Cl. 202—39.5)

The invention relates to the separation of diolefins containing 5 carbon atoms in the molecule from their admixture with other hydrocarbons in products of the treatment of petroleum fractions; and also to the purification of diolefins.

An object of this invention is to provide an improved method for concentrating isoprene from a mixture of hydrocarbons of 5 carbon atoms containing also pentenes, including 2-methyl butene-2 and cyclopentene, such as that obtained by cracking a petroleum oil, in which the hydrocarbon mixture is first distilled to produce a distillate fraction substantially free of cyclopentene but containing 2-methyl butene-2 and other pentenes, and this distillate is then subjected to extractive distillation in the presence of a volatility modifying solvent to effect separation of the pentenes as a distillate fraction from isoprene. This isoprene is then separated from the solvent, which is recycled to the upper part of the extractive distillation zone.

A process for accomplishing this separation by means of solvents such as acetone and furfural has been disclosed in U. S. Patent 2,426,705, of which the present applicant is co-inventor with John A. Patterson. The present invention involves the use of the sulfolanes as solvents. This can be done by substituting the sulfolanes for the acetone in the process of the above identified patent.

The accompanying drawing is a diagrammatical showing of means for effecting the process. The drawing contains pertinent portions of the drawing in U. S. Patent 2,426,705, and similar reference numerals are used to denote similar parts. The feed fractionating tower 10 receives the C₅ feed stock from line 11 for distilling overhead a distillate fraction containing isoprene and 2-methylbutene-2 but which is substantially free of cyclopentene. The overhead distillate fraction is removed by line 12 to condenser 13. The cyclopentene-containing bottoms is withdrawn from tower 10 by line 16. A portion of the distillate is refluxed by line 15 to the upper part of tower 10. The remaining cyclopentene-free distillate is transferred by line 21 to the extractive distillation tower 20. Fresh solvent, particularly dimethyl sulfolane, from line 83 and lean solvent withdrawn as bottoms from tower 20 by lines 26 and 27 are passed through line 39 into an upper part of tower 20. The overhead distillate comprising C₅ mono-olefins, including the 2-methylbutene-2 are to be taken overhead through line 22 from tower 20. Concentrated extract vapors comprising isoprene but substantially free of cyclopentene are transferred from a lower part of tower 20 through line 31 into the stripper or concentrating tower 30. Isoprene vapor is withdrawn overhead by line 32 from tower 30, lean solvent bottoms of tower 30 are returned by line 36 to a bottom part of tower 20. A portion of the lean solvent forming bottoms of tower 20 is withdrawn by line 26, then through 43 to a solvent recovery unit, and remaining portion of the thus withdrawn solvent is recycled through line 27 and line 39, as already stated.

From the various refining processes for the preparation of motor fuels, highly volatile liquid by-products are obtained. These liquid by-products are today of great commercial importance. Many of these liquid by-products are mixtures of low molecular-weight hydrocarbons, and as such are difficult to resolve into useful mixtures by the ordinary processes of fractional distillation. Thus, for hydrocarbons containing 5 carbon atoms in the molecule the boiling points at 760 mm. are:

| | °C. |
|---|---|
| 3-methyl butene-1 | 21.2 |
| Pentene-1 | 30.2 |
| 2-methyl butene-1 | 31.1 |
| Isoprene | 34.1 |
| Trans pentene-2 | 35.9 |
| n-Pentane | 36.0 |
| Cis pentene-2 | 37.0 |
| 2-methyl butene-2 (trimethyl ethylene) | 38.4 |
| Cyclopentadiene | 41.0 |
| Trans piperylene | 49.9 |
| Cis piperylene | 43.9 |
| Cyclopentene | 44.1 |
| Cyclopentane | 49.5 |

It is to be noted that the boiling points of the various types of compounds in the tabulation do not follow the degree of chemical saturation of the compounds. This is particularly noteworthy since highly complex mixtures of the C₅ hydrocarbons are commonly produced in large volumes as by-products from refinery cracking units. Extremely expensive fractionation equipment would be needed in order to effect the segregation of an individual constituent. Furthermore, if a fractional distillation is made upon such cracking-coil by-products at extremely high reflux ratios to obtain very narrow fractions, prolonged heating of the mixture is involved; and, as a result, considerable polymerization of the more unsaturated compounds commonly occurs. Thus, fractional distillation alone as a means for separating very narrow fractions from such mixtures is disadvantageous.

It has now been found that such complex mixtures may be advantageously resolved into their individual constituents by a unique combination of processing steps. This invention involves at least three such processing steps. In two of the three steps fractional distillation is employed. Between the two fractional distillation steps is effected an extractive distillation. The process of the invention is thus the combination of a carefully controlled fractional distillation of a suitable feed stock, followed by an extractive distillation of a particular distillate fraction, and then subsequently fractionally distilling one of the particular distillate fractions from the extraction distillation operation. The process of the invention therefore resides not only in the combination of fractional distillation steps with extractive distillation, but in the particular manner of combination in order to achieve particularly desirable fractions for the second and the third steps in the processing—namely, for the extractive distillation and the second fractional distillation steps. It is usual, also, in commercial operation to employ a fourth step—namely, the recovery of the solvent employed in the extractive distillation step. Such a step is however incidental rather than an essential feature of the process of the invention.

In order to appreciate the invention, an understanding of the basis of each step is advantageous. In fractional distillation separation of the constituents of a mixture is made upon the basis of differences, at varying temperatures, of the vapor pressures of the various compounds when in admixture one with the other. In extractive distillation, on the other hand, separation of constituents is based upon differences at different temperatures of the vapor pressures of selected groups of compounds in the presence of certain type liquids added to a fractional distillation system.

The presence of suitable liquids in an extractive distillation affects in different degrees positive deviations from Raoult's Law, that is, the volatilities of the various compounds are greater in the presence of the added liquid than would be expected based upon their normal vapor pressures. Thus, in the case of a hydrocarbon mixture containing paraffins, mono-olefins, and di-olefins, the added liquid modifies the relative volatilities of the various type hydrocarbons in such a way that in a narrow boiling fraction the paraffins will be the most volatile constituent; the mono-olefins, less volatile; and the diolefins, the least volatile. It is such an effect of an added liquid under suitable conditions of pressure and of concentration of the added liquid that contributes to the formation of azeotropic composition. In extractive distillation, however, as distinct from azeotropic distillation—the added liquid is employed in substantially greater amounts in order to exert the maximum effect upon certain groups of compounds. The amount of added liquid employed in an extractive distillation is greatly in excess of that which would form with the mixture as a whole azeotropic mixtures of the constituents thereof. Thus, the addition of the extraneous liquid in extractive distillation is related to—but very distinct from—the addition of a definite amount of the added liquid in an azeotropic distillation system.

Taking the separation of isoprene as a suitable example of the process of the invention, the first step involves the careful fractionation in multiple-plate distillation equipment of a narrow $C_5$ hydrocarbon fraction containing a substantial amount of isoprene; and, rejecting as much as possible of the piperylene, cyclopentadiene, and pentenes. A suitable source for isoprene is the refinery by-product distillate from the high temperature cracking of gas oil, virgin naphtha, kerosene, and/or other suitable feed stocks. A typical debutanized stock from this source may contain about 4% isoprene.

A distillate of this nature is first carefully fractionated in a multi-plate distillation tower so as to derive therefrom as overhead material a close boiling $C_5$ fraction containing essentially paraffins, mono-olefins, and diolefins; and, as a distillation residue, hydrocarbons of higher boiling points of $C_5$ to $C_9$ molecular content. In the first fractional distillation step, separation is thus made of a distillate containing as high a content of isoprene as is consistent with the feed stock, from the distillation residue containing a substantial quantity of the higher boiling $C_5$ hydrocarbons such as cyclopentene in association with hydrocarbons of $C_5+$ molecular content. It is to be recognized that cyclopentadiene forms azeotropes with the pentanes and therefore in the separation of the $C_5$ hydrocarbons, if cyclopentadiene is not separated in the first fractionating tower, separation from isoprene until the final purification step may thus be difficult.

The close boiling overhead fraction is then carefully distilled in the presence of an excess of an organic liquid which affects in different degrees the relative volatilities of the various type hydrocarbons. For this purpose the sulfolanes, such as di-methyl sulfolane, and mixtures thereof with water are suitable. In the case of the sulfolanes the amount employed is usually about twice the volume of the liquid hydrocarbon mixture flowing down through the tower although much larger amounts may be used if precise fractionation is desired.

Thus, under suitably controlled conditions in the presence of such quantities of added liquid, such as sulfolane, dimethyl sulfolane or other homologs of sulfolane, a vapor overhead product is obtained which consists essentially of paraffins and mono-olefins of $C_5$ molecular content. The distillation residue which is normally obtained consists essentially of solvent which is recycled to the proper point in the tower to maintain as high a solvent to hydrocarbon ratio as is advantageous for the process. The most important fraction removed from the system is the intermediate distillate material conveniently termed the side-stream product. This side-stream product consists mainly of isoprene with such quantities of piperylene and cyclopentadiene as were present in the feed and such traces of liquid polymer products as were formed during the distillation operations.

The side-stream product from the extractive distillation operation is normally treated to effect the separation of any solvent added in the extractive distillation operation. When the sulfolanes are employed as the added liquid very little of these solvents is present in either the overhead distillate or the vapor side stream from the extractive distillation column; but the side-stream product is usually countercurrently treated with water to remove the solvent, and thus to permit the isoprene and other hydrocarbons to be separated therefrom. The hydrocarbon material after the separation of solvent is then fractionally distilled under carefully controlled conditions to obtain as an overhead product one of the hydrocarbons in substantial purity. In the present case the fractional distillation is effected to obtain substantially pure isoprene as the overhead product; and to leave as distillation residue piperylenes, the cyclopentadiene not previously removed due to the presence in the system of pentanes, and smaller quantities of other impurities.

Since some polymerization—particularly of cyclopentadiene—commonly occurs during the extractive distillation step, high-boiling polymeric materials are normally present in the solvent recycle. In order to maintain the polymer content of the solvent at a low value, usually about 5% of the recycle solvent stock is removed, and is then treated for solvent recovery.

In order to illustrate the invention more clearly, the following detailed description of processing is presented. In this illustration, an example is given of the separation and purification of isoprene as obtained from the treatment of a debutanized distillate stream from a liquid phase cracking of a virgin gas oil stock. A specific example of a typical debutanized distillate stream has the following molar percentage composition:

| | |
|---|---|
| Butenes | 0.5 |
| 3-methyl butene-1 | 0.5 |
| Pentene-1 | 9.4 |
| 2-methyl butene-1 | 2.0 |
| Isoprene | 4.1 |
| Trans pentene-2 | 1.0 |
| N-pentane | 0.8 |
| Cis pentene-2 | 1.0 |
| 2-methyl butene-2 | 2.2 |
| Cyclopentadiene | 1.3 |
| Trans piperylene / Cis piperylene | 2.9 |
| Cyclopentene | 2.1 |
| Cyclopentane | 0.1 |
| $C_6$ | 11.7 |
| $C_6$ aromatics | 11.7 |
| $C_7$ | 18.7 |
| $C_8$ | 9.8 |
| $C_9$ | 20.2 |

The feed stock is supplied to a fractionating column which may be of any of the usual types, such as a fractionating tower containing bubble plates and equipped with a reflux condenser. The equipment is operated usually at about atmospheric or somewhat above atmospheric pressure. In normal operation, about 50 plates are present in such a tower. The pressure upon the system for the treatment of the specific composition given is maintained about 25 lbs. per sq. in. (gauge), in order to be able to employ ordinary water for cooling purposes in the condenser. The percentage of the feed taken off as distillate product is adjusted so as to take the major portion of the isoprene in this fraction while rejecting most of the piperylene and pentenes in the residue. In the example used for illustration, a reflux ratio of 5 is maintained while taking off approximately 19% of the feed as distillate product. Under these conditions, the temperature at the top of the tower is 141° F., while the bottom temperature is about 270° F.

The overhead product consists of a very narrow $C_5$ fraction containing the majority of the isoprene and some of the piperylene in the mixture, pentene-1 and other $C_5$ olefins and paraffins. The entire distillate is condensed and that not needed for reflux is passed to the midportion of a second fractionating column for further processing by extractive distillation with a sulfolane solvent which is supplied to the upper portion of this column. The operation of this extractive distillation unit is described in the above-mentioned U. S. Patent 2,426,705. In the processing of this feed stock, the composition of the distillate fraction under the conditions given shows the following molar percentage composition:

| | |
|---|---|
| $C_4$ | 2.6 |
| 3-methyl butene-1 | 2.6 |
| Pentene-1 | 49.9 |
| 2-methyl butene-1 | 10.4 |
| Isoprene | 19.9 |
| Trans pentene-2 | 2.1 |
| n-pentane | 5.8 |
| Cis pentene-2 | 2.9 |
| 2-methyl butene-2 | 2.9 |
| Cyclopentadiene | 0.6 |
| Cis and trans piperylene | 0.3 |

The residual material from this first column consists of most of the piperylene, some isoprene, normal pentane and some pentenes, in addition to higher boiling hydrocarbons such as cyclopentenes.

Pressure upon the extractive distillation system may also be maintained at about 25 lbs. per sq. in. (gauge), in order to have an overhead condensing temperature readily obtainable with cooling water.

The overhead distillate vapor removed from the extractive distillation tower consists of mixtures of $C_5$ olefins and paraffins when the sulfolanes are employed as the solvent.

The quantity of the sulfolanes supplied to the extractive distillation tower shall be sufficient to maintain a volume ratio of solvent to hydrocarbon mixture of at least about 1–1 and preferably in the range of about 2 to 4 volumes of solvent per volume of hydrocarbon in the liquid on the plates, from the point of introduction to the plate upon which the side stream is withdrawn. This solvent may also contain a small amount of water, insufficient to cause separation of two liquid phases in the tower, and generally in the approximate range of about 1 to 5 weight per cent based on the solvent, and preferably about 3 weight per cent. This water, being more volatile than the sulfolanes, aids the removal of hydrocarbons from the solvent. Below the plate from which the side stream product is withdrawn, the solvent is stripped of its hydrocarbon content.

The bottoms withdrawn from the extractive distillation tower thus will consist of relatively pure solvent, including water if it is used to modify the solvent. This solvent, except for a small portion which may be withdrawn for purification, is cooled and returned to the upper portion of the extractive distillation tower. Thus, the major part of the solvent continuously recycles within the extractive distillation system.

The vapor side stream removed from this system contains a high concentration of isoprene with small amounts of other diolefins, and a small proportion of the solvent. This side stream material may be water washed or redistilled to remove the solvent, and may be further fractionated to separate pure isoprene from higher boiling hydrocarbons as described in said U. S. Patent 2,426,705.

The degree of separation of the hydrocarbons taking place in the extractive distillation system is dependent on two functions, namely, the ratio of the solvent to hydrocarbon liquid on the plates and the ratio of liquid to vapor flowing through the tower. The ratio of solvent to hydrocarbon is controlled by the rate of solvent recirculation. The ratio of liquid to vapor in the zone of high solvent to hydrocarbon ratio, that is below the solvent inlet is controlled by the reflux ratio, which may suitably be in the range of about 5 to 10.

In the operation of the extractive tower separation into the zones indicated above is clearly defined by the various temperature zones. Thus, the vapor leaving the top of the tower is at 140° F. The temperature rises sharply to about 155° F. between the top of the tower and the plate on which the solvent is admitted, then very slowly reaching about 160° F. at the plate where the vapor side stream is withdrawn. Below the plate from which the side stream is removed and as a result of the concentration of the solvent the temperature rises sharply above about 208° F. to the temperature prevailing at the bottom of the tower. The side stream from the extractive distillation tower is partially purified isoprene in a high concentration. Impurities present in the stream are largely piperylene, cyclopentadiene and polymers. The isoprene in this stream may be further purified by straight distillation under good rectification conditions, as in a fractional distillation tower of about 50 plates operating under reflux.

The bottoms from this fractionation will consist of the piperylene and cyclopentadiene, in addition to any polymer or high boiling constituents of the feed to the tower. These materials may also be separated by further distillation, and additional cyclopentadiene may be obtained by depolymerization of the polymer.

To illustrate the effectiveness of the solvent in the above described extractive distillation operation, a mixture containing 85 weight percent dimethyl sulfolane, and the balance equal proportions of isoprene and 2-methyl butene-2, was distilled in an equilibrium still. Analysis of the reflux and the still contents gave a relative volatility of 2-methyl butene-2 to isoprene of 1.30, while the normal alpha of the straight hydrocarbon mixture, in the absence of solvent, is 0.88, thus clearly indicating the reversal in relative volatility of these hydrocarbons by the use of this solvent.

Other sulfolanes which may be used in the above described process include those which are liquid and stable under the operating temperatures used. These include generally the heterocyclic compound sulfolane, $(CH_2)_4SO_2$, its homologs and derivatives in which one or more of the hydrogen atoms is replaced by an organic radical which may contain a polar grouping, particularly containing oxygen, nitrogen sulfide and/or halide atoms. The sulfolanes described in U. S. P. 2,360,859 can also be used in the process of this invention, either alone, in admixture with each other, or in conjunction with other solvents, modifying agents and anti-solvents as described in said patent.

I claim:

An improved process for the separation of isoprene of high purity from a hydrocarbon fraction rich in various $C_5$ hydrocarbons; both mono-olefins, and diolefins, including isoprene, 2-methyl-butene-2, cyclopentadiene, straight chain $C_5$ dienes and cyclopentene, which comprises at least two distillation stages each conducted in a separate fractionating tower, one of said distillation stages being effected in the absence of a volatility modifier wherein reflux ratio and a number of contact stages are interadjusted to effect separation between a distillate fraction containing isoprene, 2-methyl-butene-1, pentene-1, 2-methyl-butene-2 and substantially free of cyclopentene, and a second fraction containing cyclopentadiene, straight chain $C_5$ dienes and cyclopentane; and the other distillation stage being conducted on said distillate fraction containing isoprene and in the presence of a dimethyl sulfolane as a volatility modifying solvent introduced substantially above the point of hydrocarbon feed supply in an amount sufficient to maintain a large proportion of at least two volumes of said solvent per volume of hydrocarbon in the liquid phase present above the feed plate in the distillation zone in which the hydrocarbon fractionation is being effected, with hydrocarbon reflux ratio, solvent to hydrocarbon ratio and number of contact stages interadjusted to effect substantially complete separation of isoprene from the $C_5$ olefins in the said isoprene-containing fraction including 2-methyl-butene-1, pentene-1 and 2-methylbutene-2, separating the isoprene from the solvent and recycling the solvent to said distillation zone above the hydrocarbon feed supply.

HAROLD W. SCHEELINE.

REFERENCES CITED

The following references are of record in the file of this patent:

UNITED STATES PATENTS

| Number | Name | Date |
|---|---|---|
| 2,360,859 | Evans et al. | Oct. 24, 1944 |
| 2,360,861 | Pierotti et al. | Oct. 24, 1944 |
| 2,426,705 | Patterson et al. | Sept. 2, 1947 |
| 2,434,706 | Hackmuth | Jan. 20, 1948 |
| 2,455,803 | Pierotti | Dec. 7, 1948 |
| 2,534,013 | Garrett | Dec. 12, 1950 |